US012424793B2

(12) United States Patent
Tanikawa

(10) Patent No.: US 12,424,793 B2
(45) Date of Patent: Sep. 23, 2025

(54) PLUG LOCK MECHANISM

(71) Applicant: Twinbird Corporation, Niigata (JP)

(72) Inventor: Jun Tanikawa, Niigata (JP)

(73) Assignee: Twinbird Corporation, Niigata (JP)

( * ) Notice: Subject to any disclaimer, the term of this patent is extended or adjusted under 35 U.S.C. 154(b) by 295 days.

(21) Appl. No.: 18/265,735

(22) PCT Filed: Dec. 13, 2021

(86) PCT No.: PCT/JP2021/045785
§ 371 (c)(1),
(2) Date: Jun. 7, 2023

(87) PCT Pub. No.: WO2022/138274
PCT Pub. Date: Jun. 30, 2022

(65) Prior Publication Data

US 2024/0030652 A1 Jan. 25, 2024

(30) Foreign Application Priority Data

Dec. 25, 2020 (JP) ................................ 2020-217053

(51) Int. Cl.
*H01R 13/639* (2006.01)

(52) U.S. Cl.
CPC ................................ *H01R 13/639* (2013.01)

(58) Field of Classification Search
CPC ................................................ H01R 13/639
See application file for complete search history.

(56) References Cited

U.S. PATENT DOCUMENTS 2,190,230 A * 2/1940 Cole ...................... H01R 33/94 439/372
4,376,563 A * 3/1983 Margrave ............. H01R 13/627 439/372

(Continued)

FOREIGN PATENT DOCUMENTS

JP 7-153526 A 6/1995
JP 2001-74009 A 3/2001

(Continued)

OTHER PUBLICATIONS

International Search Report issued Feb. 22, 2022 in connection with PCT/JP2021/045785.

(Continued)

*Primary Examiner* — Neil Abrams
(74) *Attorney, Agent, or Firm* — Akerman LLP

(57) ABSTRACT

Provided is a plug lock mechanism allowing a locking member to be retained at any position with a simple structure. The plug lock mechanism has a plug that can be plugged into and pulled out of a power receiving connector as a female connector; and a locking member that is swingably and axially supported by a pair of shaft receiving portions that are provided across the power receiving connector. This locking member coaxially has a pair of shaft portions that are located at both ends thereof, and central axes X1L and X1R of shaft receiving holes of the shaft receiving portions are slanted with respect to a central axis of the shaft portions. Thus, the locking member can be retained at any position via a friction caused by allowing the shaft portions to be pressed against part of the inner walls of the shaft receiving holes.

4 Claims, 13 Drawing Sheets

(56) References Cited

U.S. PATENT DOCUMENTS

| | | | | |
|---|---|---|---|---|
| 5,174,781 | A * | 12/1992 | Muzslay | H01R 13/6395 439/372 |
| 6,767,243 | B2 * | 7/2004 | McCoy | H01R 13/5213 439/892 |
| 2024/0030652 | A1 * | 1/2024 | Tanikawa | H01R 13/639 |

FOREIGN PATENT DOCUMENTS

| | | | |
|---|---|---|---|
| JP | 2003-65355 | A | 3/2003 |
| JP | 2004-108453 | A | 4/2004 |

OTHER PUBLICATIONS

Microfilm of the specification and drawings annexed to the request of Japanese Utility Model Application No. 053629/1976 (Laid-open No. 145278/1977), Kanto Seiki K.K., Nov. 4, 1977.

* cited by examiner

PLUG LOCK MECHANISM

CROSS-REFERENCE TO RELATED APPLICATIONS

This application is a national phase of PCT/JP2021/045785, filed Dec. 13, 2021, and claims priority to Japanese Patent Application No. 2020-217053, filed on Dec. 25, 2020, the entire contents of both of which are hereby incorporated by reference.

TECHNICAL FIELD

The present invention relates to a plug lock mechanism capable of preventing a plug that has been connected to a female connector from being inadvertently disconnected therefrom.

BACKGROUND ART

Conventionally, as such a kind of plug lock mechanism, there is known an inlet connector having an inlet (corresponding to the female connector in the invention of the present application) equipped with a pair of protrusions (corresponding to the shaft receiving portions in the invention of the present application), and a cable connector (corresponding to the plug in the invention of the present application) that is to be connected to such inlet, where a hole (corresponding to the shaft receiving hole in the invention of the present application) is provided in each of the paired protrusions, and both ends of a spring member (corresponding to the locking member in the invention of the present application) are to be inserted through these holes so as to allow the spring member itself to be rotatably and axially supported (e.g. Patent document 1). Further, since a locking portion of the spring member will be latched onto a rear end portion of the cable connector after plugging the cable connector into the inlet, a movement in a pull-out direction of the cable connector shall be restricted, thereby preventing the cable connector from being inadvertently disconnected from the inlet.

PRIOR ART DOCUMENTS

Patent Documents

Patent document 1: JP-A-Hei 7-153526

SUMMARY OF THE INVENTION

Problems to be Solved by the Invention

However, in such plug lock mechanism, since the locking member is merely axially supported by the shaft receiving holes, the plug has to be plugged into the female connector while retaining a raised state of the locking member. As described in Patent document 1, while there should be no particular problem if the surface of a device on which the plug lock mechanism is to be installed is flat, there has been a problem that if the female connector is provided in a recessed area of the device, it is difficult to hold the locking member. Further, it is also conceivable to install in the device or the shaft receiving portion a mechanism capable of engaging with the locking member and thereby retaining the position thereof; however, for example, there has also been a problem that such mechanism is not always engageable with the locking member depending on the shape of the device.

It is an object of the present invention to solve the abovementioned problems by providing a plug lock mechanism capable of retaining the locking member at any position via a simple structure.

Means to Solve the Problems

A plug lock mechanism according to a first aspect of the present invention, includes:

- a female connector;
- a plug that can be plugged into and pulled out of the female connector;
- a pair of shaft receiving portions that are provided across the female connector; and
- a locking member that is swingably and axially supported by the shaft receiving portions, the locking member coaxially having a pair of shaft portions that are located at both ends thereof and correspond to the shaft receiving portions,
- wherein central axes of shaft receiving holes of the shaft receiving portions are slanted with respect to a central axis of the shaft portions, and the shaft portions are to be pressed against inner walls of the shaft receiving holes.

Further, a plug lock mechanism according to a second aspect of the present invention is such that in the first aspect, the shaft portions are to be respectively pressed against the inner walls of the shaft receiving holes at two or more sites that are distant from each other in the direction of the central axis of the shaft portions.

Furthermore, a plug lock mechanism according to a third aspect of the present invention is such that in the first aspect, the locking member is configured by bending a metal wire material, and the shaft receiving portions are made of a synthetic resin that is softer than the metal wire material.

Furthermore, a plug lock mechanism according to a fourth aspect of the present invention is such that in the first aspect, the shaft receiving holes are slanted in such a manner that entrance sides thereof are more oriented toward a pull-out direction of the plug than back sides thereof.

Effects of the Invention

As for the plug lock mechanism according to the first aspect of the present invention, since the plug lock mechanism has the above configuration, regardless of the shape of a device in which the plug lock mechanism is to be installed, due to the simple structure, after plugging the plug into the female connector while retaining the locking member at any position via the friction caused by allowing the shaft portions to be pressed against the shaft receiving holes, the locking member can then prevent the plug from being pulled out.

Here, since the shaft portions are to be respectively pressed against the shaft receiving holes at two or more sites that are distant from each other in the direction of the central axis of the shaft portions, the locking member can be stably swung without wobbling.

Moreover, since the locking member is configured by bending a metal wire material, and the shaft receiving portions are made of a synthetic resin that is softer than the metal wire material, the shaft receiving holes shall undergo deformation so as to be able to abut against the shaft portions via wide surfaces, thereby allowing the locking member to be reliably retained by friction.

In addition, since the shaft receiving holes are slanted in such a manner that the entrance sides thereof are more oriented toward the pull-out direction of the plug than the back sides thereof, the locking member can be easily attached to the shaft receiving portions.

BRIEF DESCRIPTION OF THE DRAWINGS

FIG. 2 is a vertical cross-sectional view of the plug lock mechanism of the embodiment of the present invention, in which a plug has not yet been plugged in.

FIG. 3 is a horizontal cross-sectional view of the plug lock mechanism of the embodiment of the present invention, in which the plug has not yet been plugged in.

FIG. 4 is a vertical cross-sectional view of the plug lock mechanism of the embodiment of the present invention, in which the plug has been plugged in.

FIG. 5 is a horizontal cross-sectional view of the plug lock mechanism of the embodiment of the present invention, in which the plug has been plugged in.

MODE FOR CARRYING OUT THE INVENTION

Figure 1:
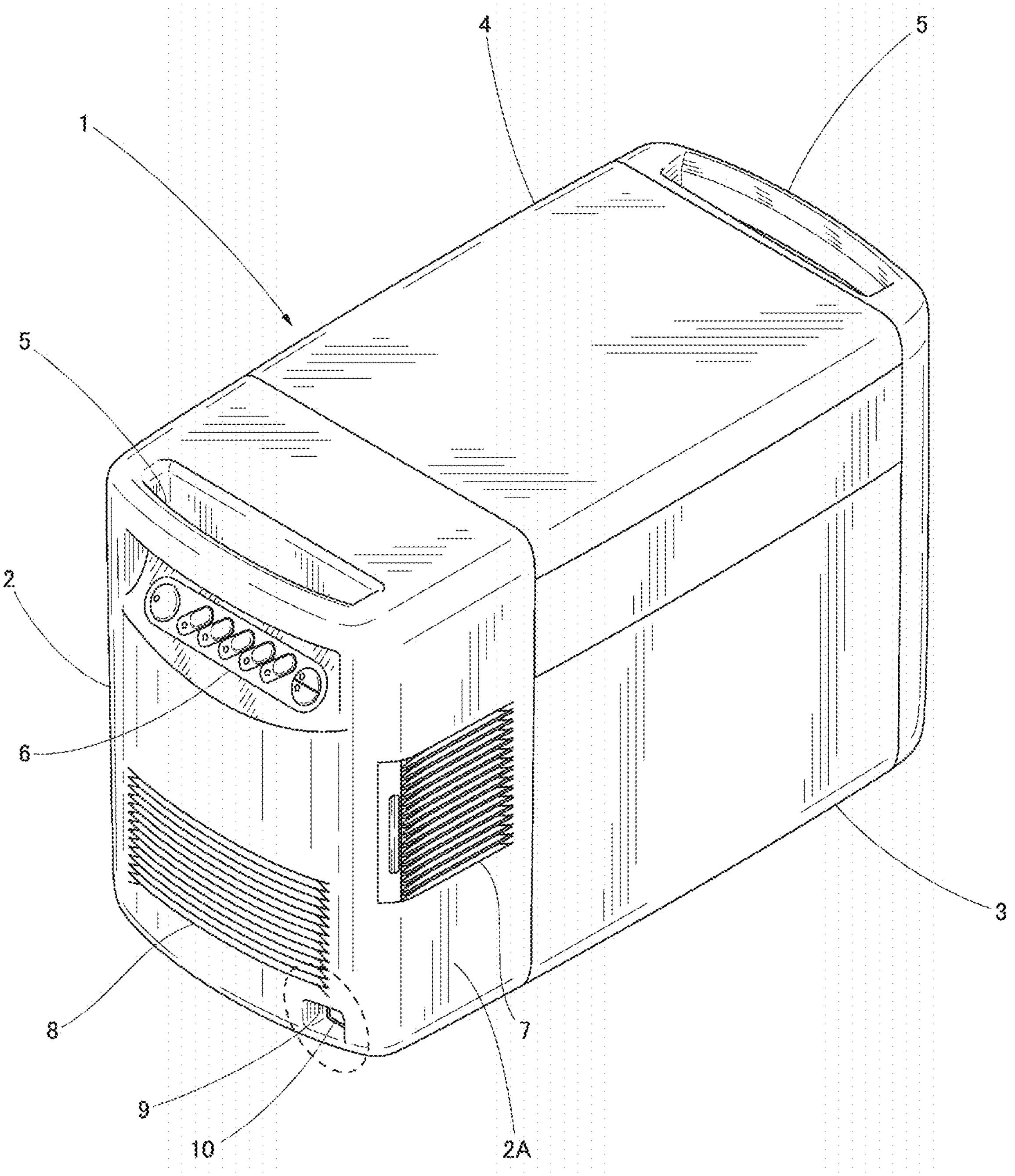
FIG. 1 is a perspective view showing a portable freezer-refrigerator as a device equipped with a plug lock mechanism of an embodiment of the present invention.
Figure 2:
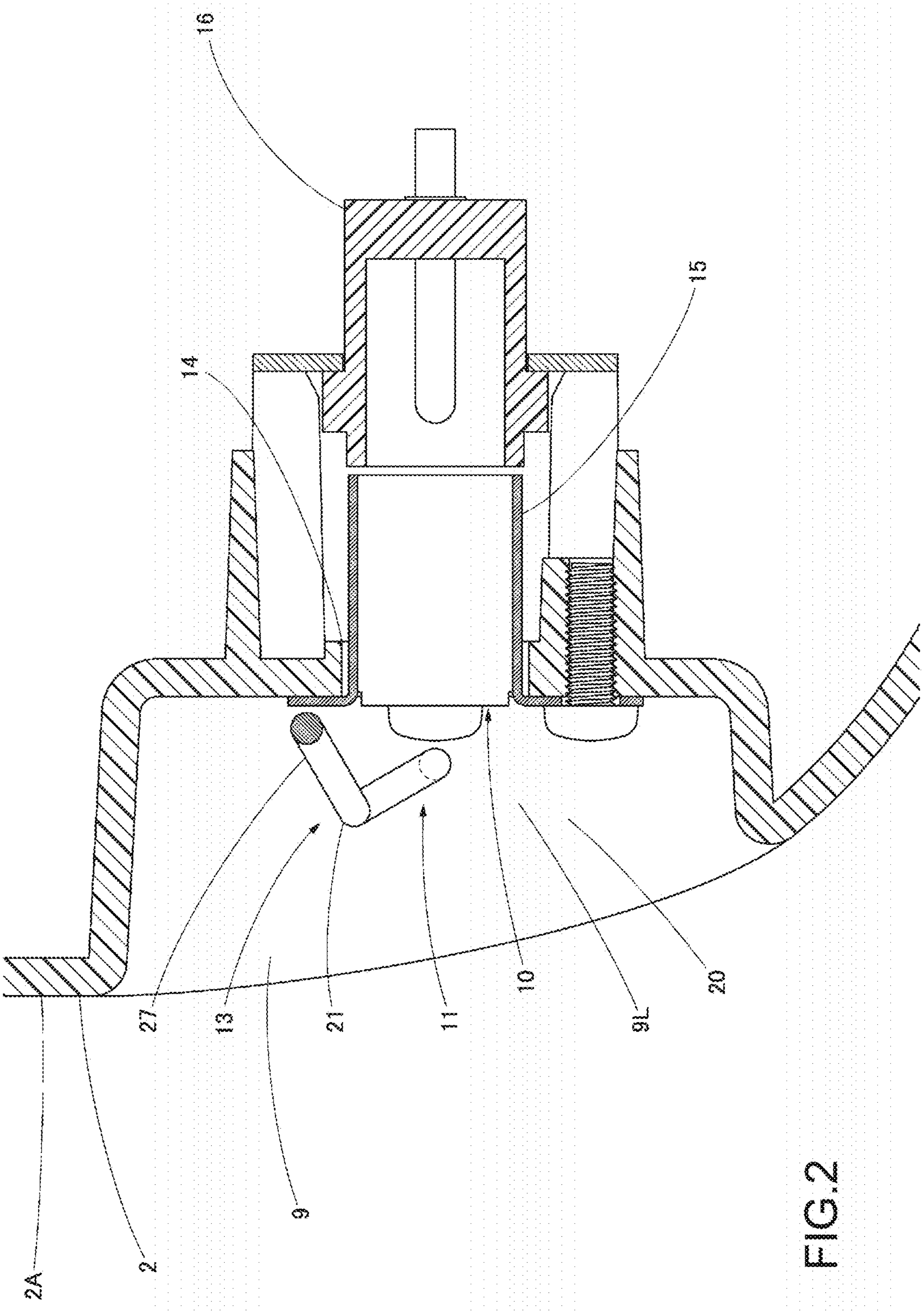
Figure 3:
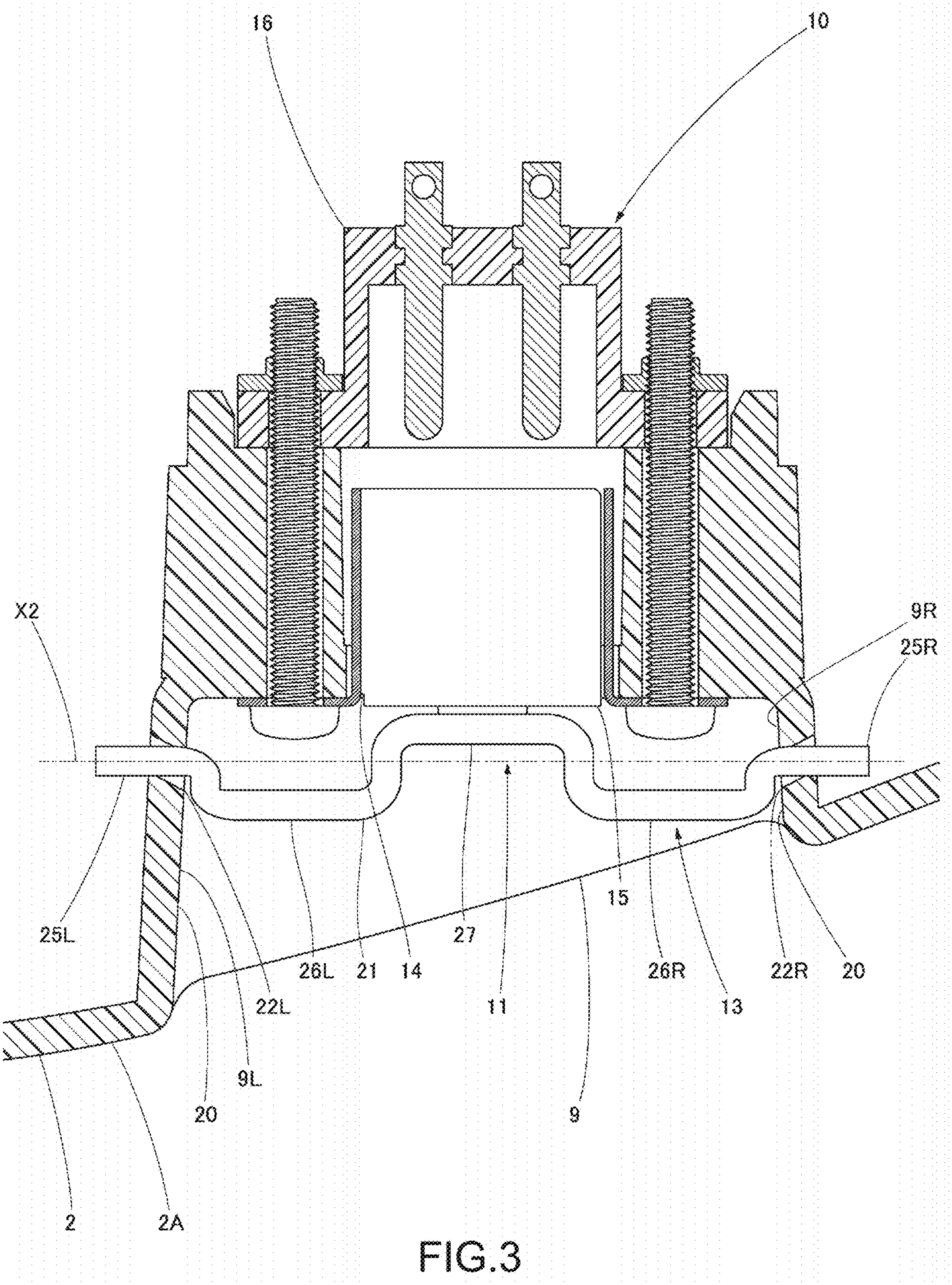
Figure 4:
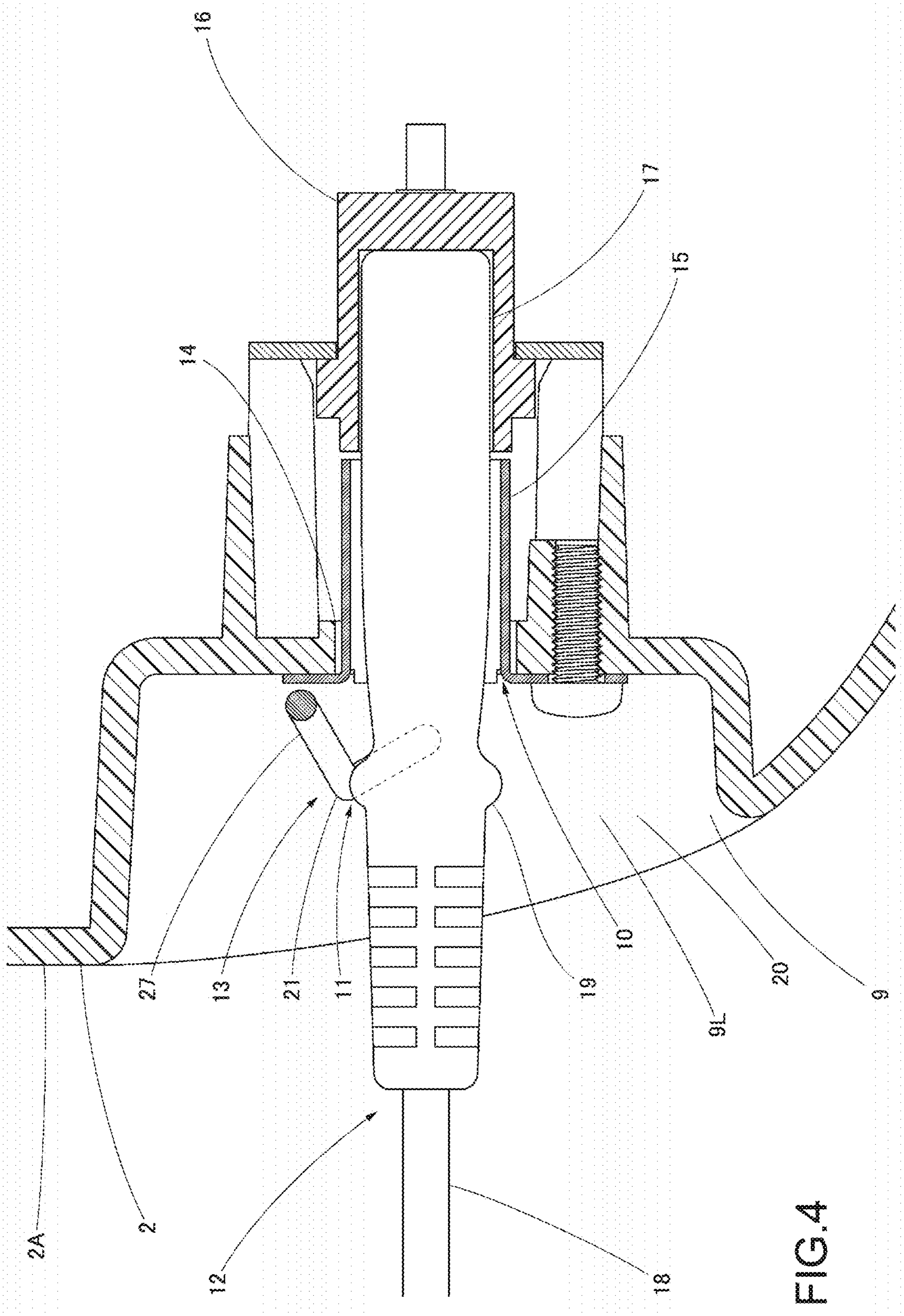
Figure 5:
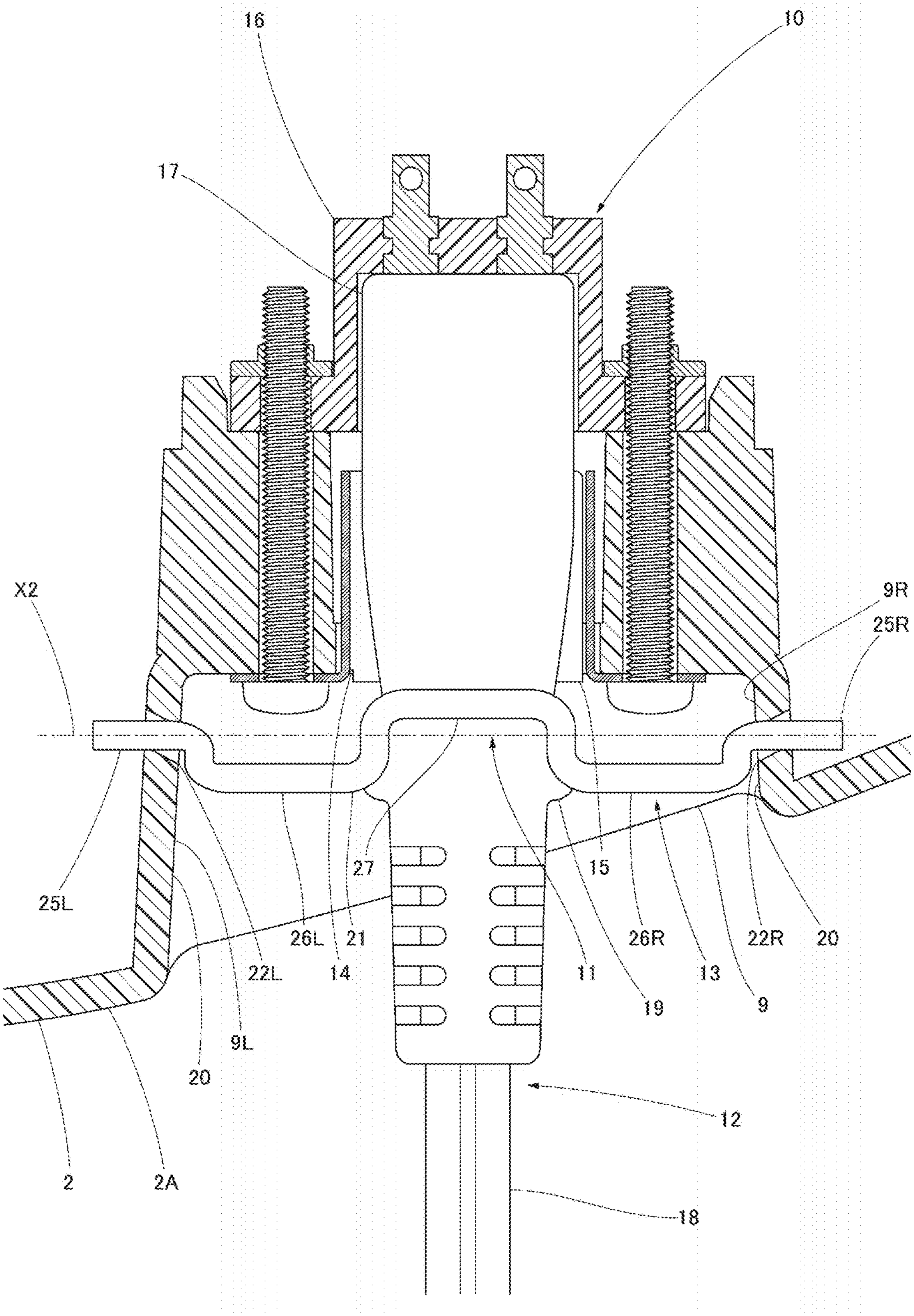
Figure 6:
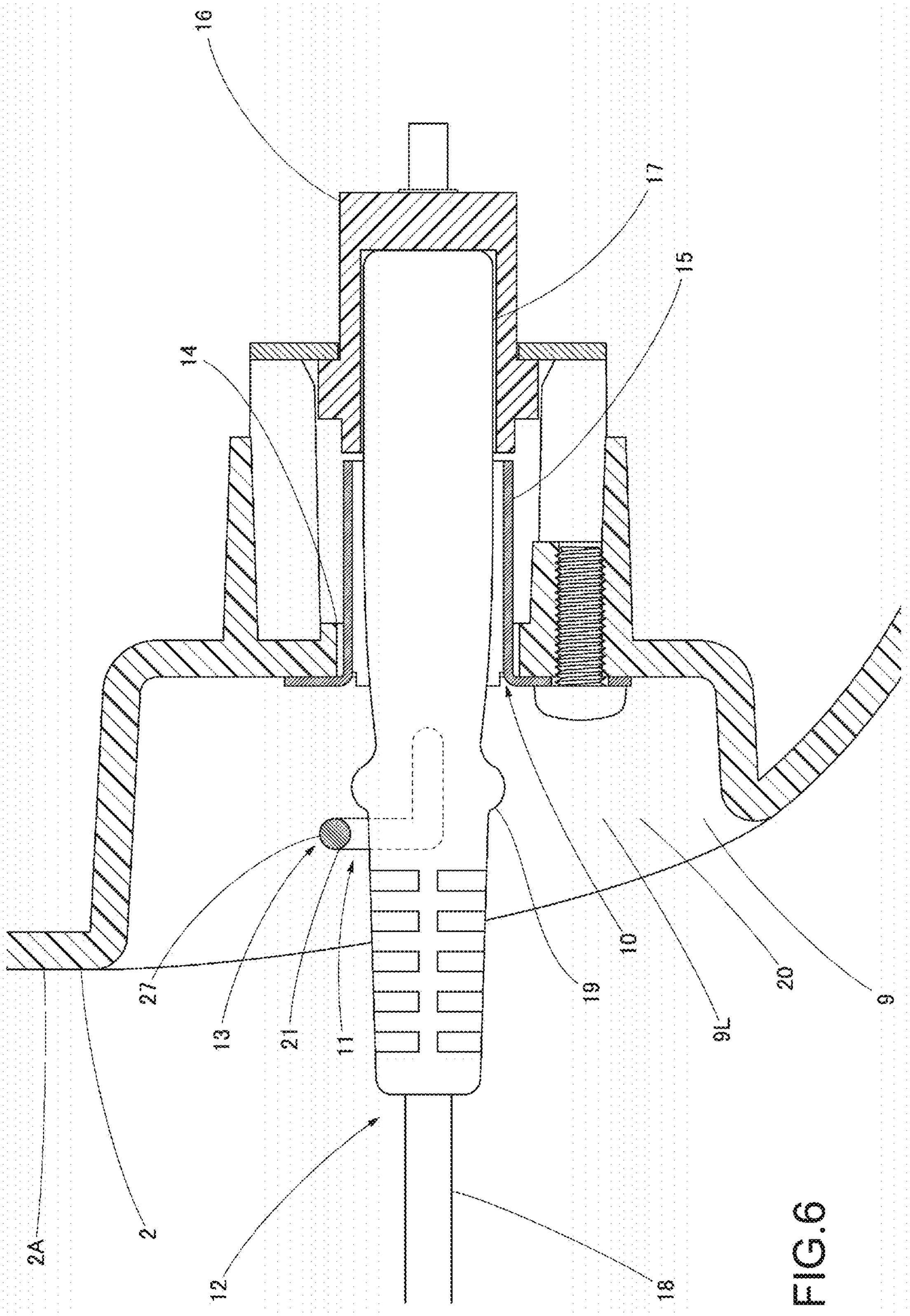
FIG. 6 is a vertical cross-sectional view of the plug lock mechanism of the embodiment of the present invention, in which the plug has been locked.
Figure 7:
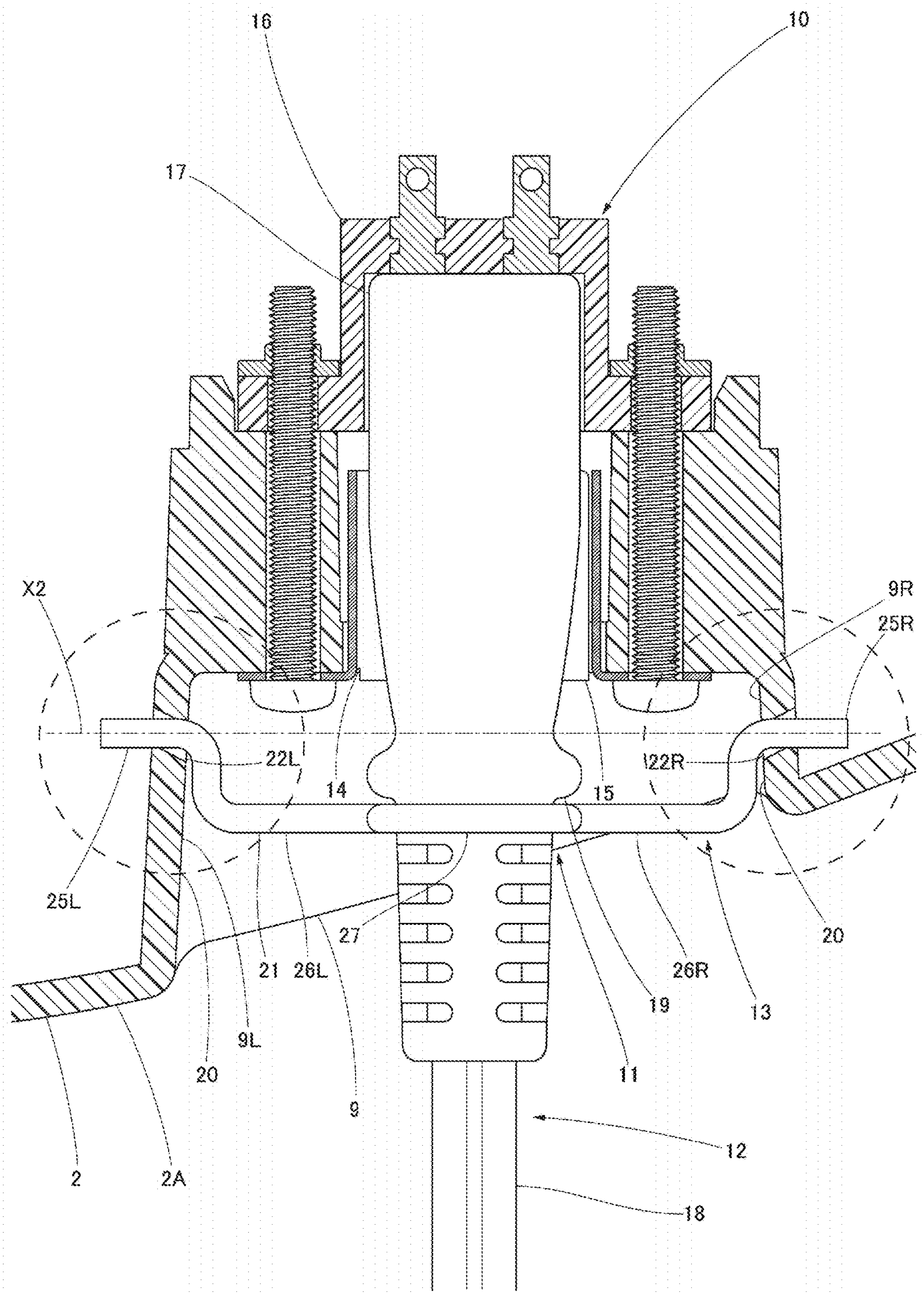
FIG. 7 is a horizontal cross-sectional view of the plug lock mechanism of the embodiment of the present invention, in which the plug has been locked.
Figure 8:
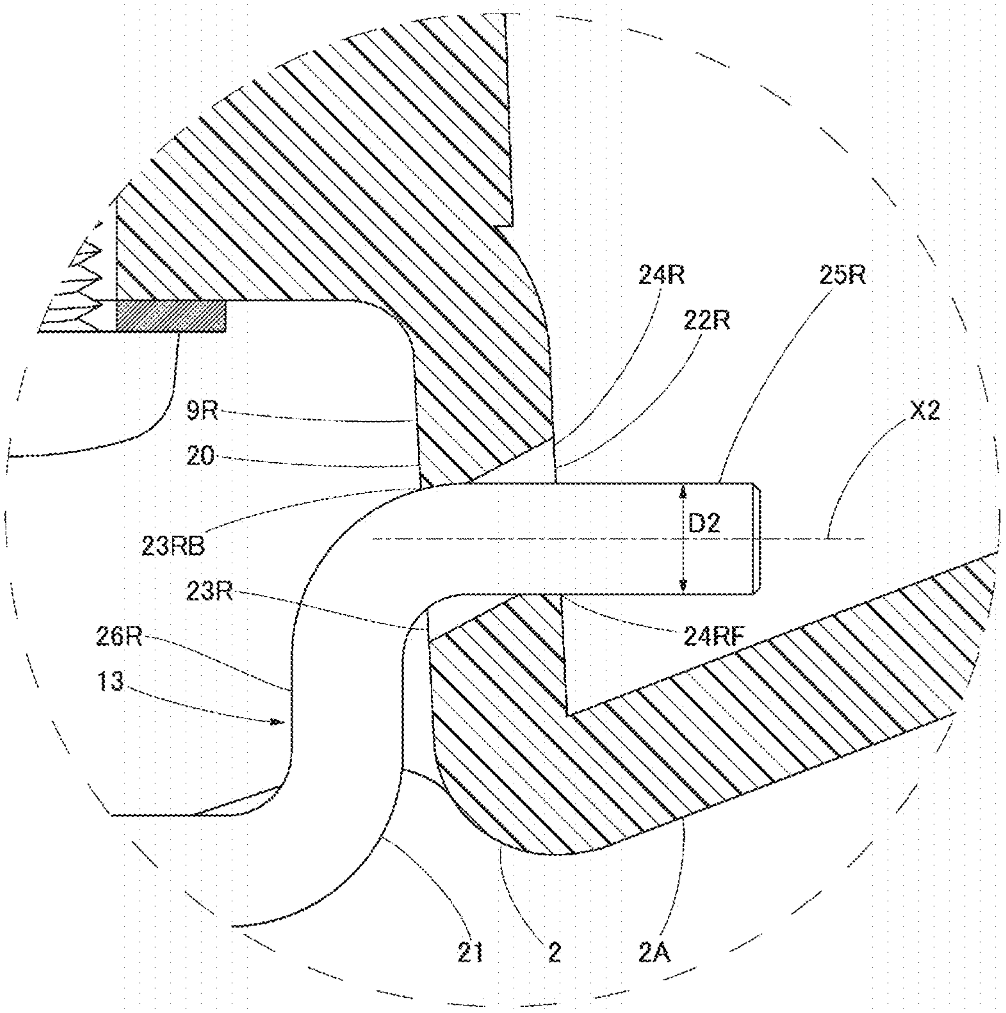
FIG. 8 is an enlarged cross-sectional view showing a configuration in the vicinity of a right shaft receiving hole in the embodiment of the present invention.

An embodiment of the present invention is described hereunder based on FIGS. 1 to 12. Here, the upper and lower directions in FIGS. 2, 4 and 6 are defined as the upper and lower directions in the embodiment. Further, the left and right directions in FIGS. 3, 5 and 7 are defined as the left and right directions in the embodiment.

A symbol "1" represents a portable freezer-refrigerator as a device equipped with a plug lock mechanism 11 of the present invention. This portable freezer-refrigerator 1 has a mechanical part 2, a storage part 3 and a lid body 4, where a handle 5 is provided on both the mechanical part 2 side and the storage part 3 side. Further, an operation part 6, an intake part 7 and an exhaust part 8 are provided on the mechanical part 2. Moreover, a concave part 9 is provided on a synthetic resin-made outer shell 2A of the mechanical part 2; a power supply connection part 10 for supplying power to a cooling mechanism not shown is provided in this concave part 9. Here, since the basic structure of the portable freezer-refrigerator 1 is known, detailed descriptions thereof are omitted.

The plug lock mechanism 11 is configured in such a manner that it has the power supply connection part 10, a power supply cord 12 and a plug lock part 13. The power supply connection part 10 has a through hole 14 provided in the innermost part of the concave part 9; a guiding cylinder 15 attached to the through hole 14; and a power receiving connector 16 as a female connector provided in the proximity of an inner end of the guiding cylinder 15. Here, in this example, the guiding cylinder 15 is made of a metal, and is configured separately from the synthetic resin-made outer shell 2A of the mechanical part 2 in which the through hole 14 is formed; the guiding cylinder 15 may be formed integrally with the outer shell 2A from a synthetic resin. Further, the guiding cylinder 15 is not necessarily needed depending on the shape of a plug 17 of the power supply cord 12 connected to the power receiving connector 16. In addition, the power supply cord 12 is configured in such a manner that it has an electric wire part 18 and the plug 17 provided at the tip of the electric wire part 18. Moreover, a locking surface 19 is formed on an electric wire part 18-side end portion of the plug 17. In this example, the locking surface 19 is a convex strip formed into the shape of a convex curved surface. Further, a plug-in direction of the plug 17 is a horizontal and inward direction (right direction in FIGS. 2, 4 and 6; upper direction in FIGS. 3, 5 and 7). In other words, a pull-out direction of the plug 17 is a horizontal and outward direction (left direction in FIGS. 2, 4 and 6; lower direction in FIGS. 3, 5 and 7).

The plug lock part 13 has a pair of shaft receiving portions 20, 20 and a locking member 21. The shaft receiving portions 20, 20 are a left wall 9L and right wall 9R of the concave part 9, and a left shaft receiving hole 22L and a right shaft receiving hole 22R are respectively formed on these left wall 9L and right wall 9R. Here, these shaft receiving holes 22L and 22R are not coaxial; a central axis X1L of the left shaft receiving hole 22L and a central axis X1R of the right shaft receiving hole 22R intersect with each other. Further, the shaft receiving holes 22L and 22R are formed by puncturing the left wall 9L and the right wall 9R respectively. Thus, the left shaft receiving hole 22L has a first rim 23L and a second rim 24L. Likewise, the right shaft receiving hole 22R has a first rim 23R and a second rim 24R. Here, since the first rims 23L, 23R are provided on the outer surface of the concave part 9 of the outer shell 2A, they are positioned inward with respect to the second rims 24L, 24R. Further, the shaft receiving holes 22L, 22R are each a circular hole, and each have an inner diameter of D1. Here, the shaft receiving holes 22L, 22R may be formed at the time of molding the outer shell 2A, or via post processing in which the shaft receiving holes are to be bored in the left wall 9L and the right wall 9R.

The locking member 21 is configured by bending a metal wire material such as steel that has a circular cross-sectional shape and is harder than the synthetic resin making up the outer shell 2A. Specifically, the locking member 21 has a pair of shaft portions 25L, 25R formed on both ends; arm portions 26L, 26R provided on the inner side of these shaft portions 25L, 25R; and a locking portion 27 provided on the inner side of these arm portions 26L, 26R. Here, the shaft portions 25L, 25R and the arm portions 26L, 26R are provided on an identical virtual plane VPX. Further, the locking portion 27 is provided on a virtual plane VPY orthogonal to the virtual plane VPX. Moreover, the locking member 21 is formed symmetrically about the center of the locking portion 27 in the left and right directions. In addition, the paired shaft portions 25R have a common central axis X2. That is, the locking member 21 is swingable about the central axis X2. Here, an outer diameter of each of the paired shaft portions 25L, 25R is D2. And, D1>D2. Thus, the paired shaft portions 25L, 25R can be respectively inserted into the shaft receiving holes 22L and 22R. Further, the length of each of the shaft portions 25L, 25R in the axial direction is formed sufficiently longer than the thickness of each of the left wall 9L and right wall 9R. Therefore, as a result of attaching the locking member 21 to the paired shaft receiving portions 20, 20, the tips of the shaft portions 25L, 25R shall inwardly protrude even beyond the inner surface of the outer shell 2A.

As described above, the central axis X1L of the left shaft receiving hole 22L and the central axis X1R of the right shaft receiving hole 22R intersect with each other. These central axes X1L and X1R are slanted with respect to the central axis X2 of the shaft portions 25L, 25R of the locking member 21. In this example, as for the shaft receiving holes 22L, 22R, the central axes X1L and X1R are slanted in such a manner that the first rims 23L, 23R are more oriented toward the pull-out direction of the plug 17 (lower directions in FIGS. 3, 5 and 7) than the second rims 24L, 24R.

Figure 9A:
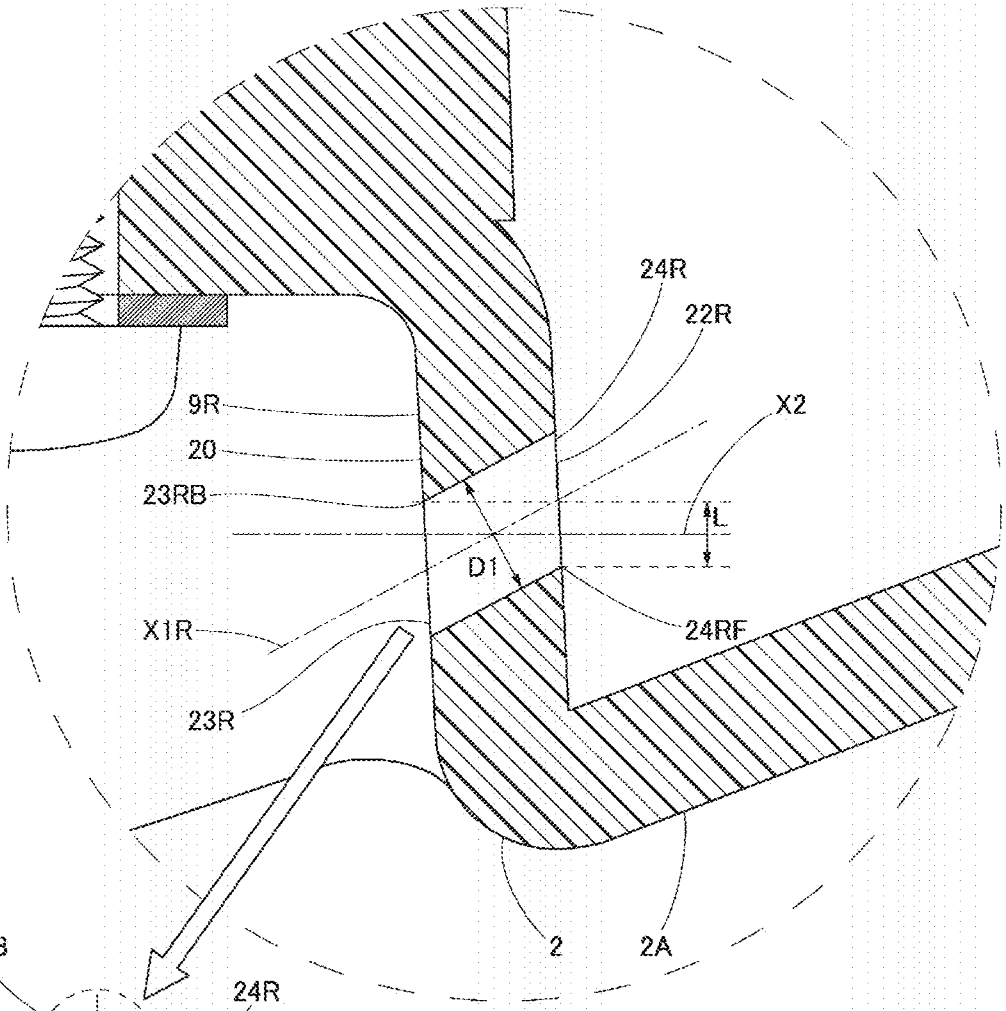
FIG. 9A is an enlarged cross-sectional view showing the configuration in the vicinity of the right shaft receiving hole in the embodiment of the present invention, in which a locking member has been removed.
Figure 9B:
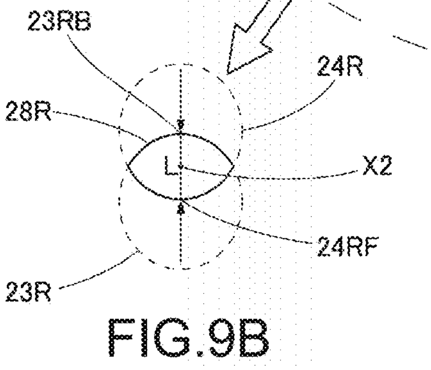
FIG. 9B shows the right shaft receiving hole when viewed from the direction of a central axis.
Figure 10:
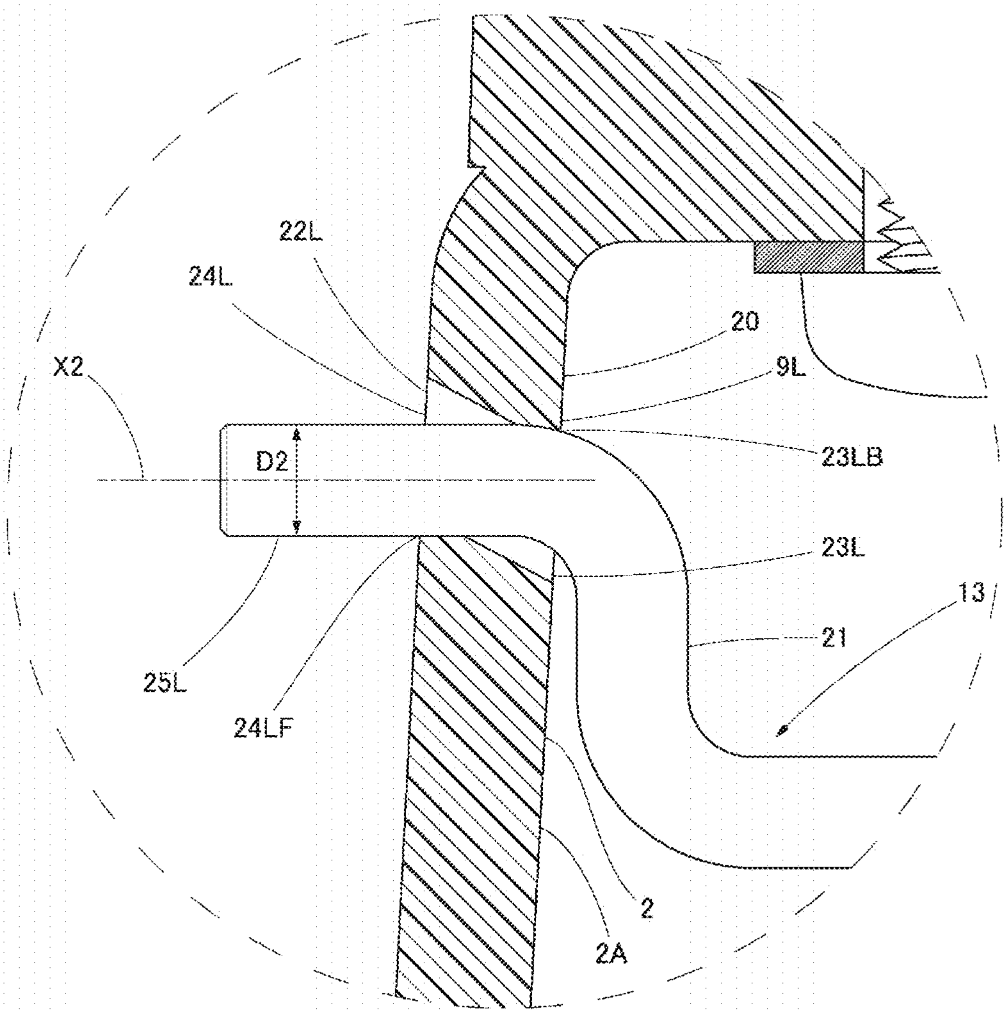
FIG. 10 is an enlarged cross-sectional view showing a configuration in the vicinity of a left shaft receiving hole in the embodiment of the present invention.
Figure 11A:
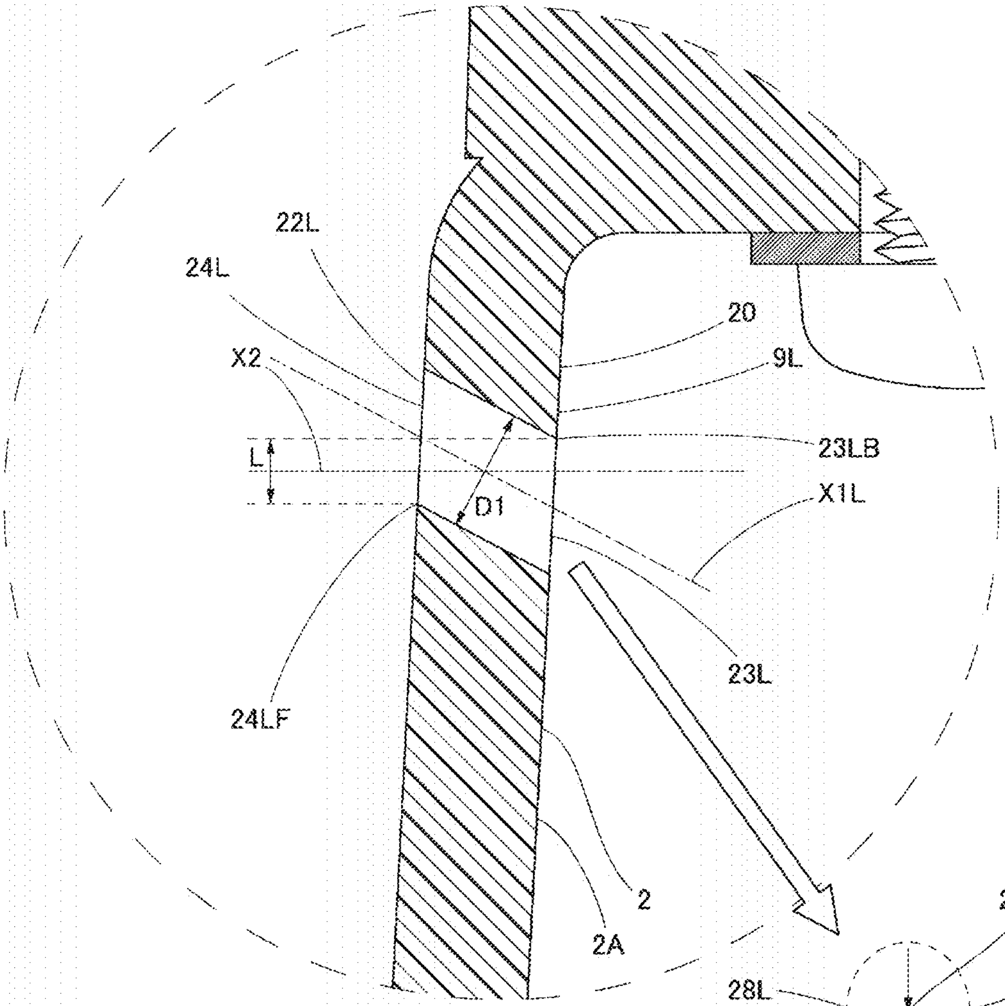
FIG. 11A is an enlarged cross-sectional view showing the configuration in the vicinity of the left shaft receiving hole in the embodiment of the present invention, in which the locking member has been removed.
Figure 11B:
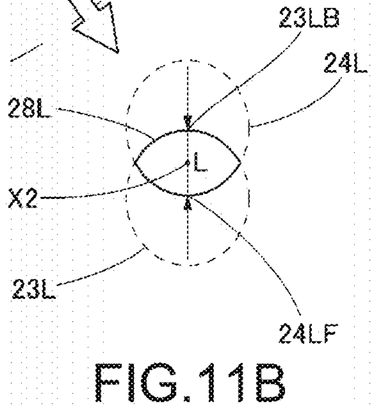
FIG. 11B shows the left shaft receiving hole when viewed from the direction of the central axis.
Figure 12:
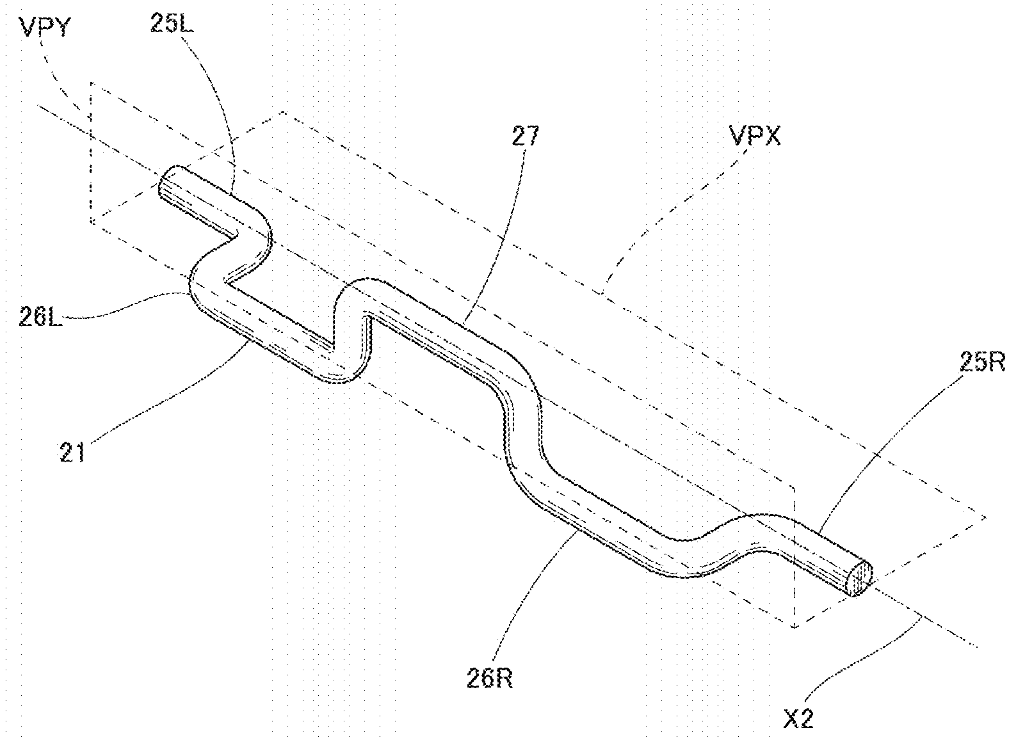
FIG. 12 is a perspective view of the locking member of the embodiment of the present invention.

In this way, since the first rims 23L, 23R are deviated toward the pull-out direction of the plug 17 (lower directions in FIGS. 3, 5 and 7) with respect to the second rims 24L, 24R, the shaft receiving holes 22L, 22R, when viewed from the axial direction of the shaft portions 25L, 25R, exhibit non-circular overlaps 28L, 28R as shown in FIGS. 9A, 9B and 10. Further, a short dimension L passing through the central axis X2 of the non-circular overlaps 28L, 28R is smaller than the outer diameter D2 of each of the shaft portions 25L, 25R. Thus, once the shaft portions 25L, 25R have been inserted into the shaft receiving holes 22L, 22R, the shaft portions 25L, 25R shall be respectively pressed against the first rims 23L, 23R and the second rims 24L, 24R. Specifically, the shaft portion 25L is pressed against a back portion 23LB of the first rim 23L and a front portion 24LF of the second rim 24L. Similarly, the shaft portion 25R is pressed against a back portion 23RB of the first rim 23R and a front portion 24RF of the second rim 24R. Moreover, as described above, since the synthetic resin making up the shaft receiving portions 20, 20 (i.e. the outer shell 2A) is softer than the metal such as steel making up the locking member 21, the back portions 23 LB, 23RB of the first rims 23L, 23R and the front portions 24LF, 24RF of the second rims 24L, 24R that are to be pressed against the shaft portions 25L, 25R shall be squashed. For this reason, the shaft portions 25L, 25R will be brought into surface contact with the shaft receiving holes 22L, 22R. Further, the shaft portions 25L, 25R will each be pressed against each of the corresponding shaft receiving holes 22L, 22R at two sites that are distant from each other in the direction of the central axis X2.

Here, as described above, since the central axes X1L and X1R of the shaft receiving holes 22L, 22R are slanted in such a manner that the first rims 23L, 23R are more oriented toward the pull-out direction of the plug 17 (lower directions in FIGS. 3, 5 and 7) than the second rims 24L, 24R, the shaft portions 25L, 25R of the locking member 21 can be easily inserted into the shaft receiving holes 22L, 22R when assembling the plug lock mechanism 11. This allows the locking member 21 to be easily attached to the shaft receiving portions 20, 20. That is, the plug lock mechanism 11 can be assembled easily.

Next, the function of the present embodiment is described. However, descriptions about the operation of the portable freezer-refrigerator 1 itself are omitted.

As shown in FIGS. 2 and 3, a user at first swings the locking member 21 so as to raise the locking portion 27. As described above, the locking member 21 swings about the central axis X2 of the shaft portions 25L, 25R. Further, as described above, since the central axes X1L and X1R of the shaft receiving holes 22L, 22R of the shaft receiving portions 20, 20 are slanted with respect to the central axis X2 of the shaft portions 25L, 25R, when viewed from the direction of the central axis X2, the short dimension(s) L as a clearance between the back portions 23LB, 23RB of the first rims 23L, 23R of the shaft receiving holes 22L, 22R and the front portions 24LF, 24RF of the second rims 24L, 24R of the shaft receiving holes 22L, 22R is smaller than the outer diameter D2 of each of the shaft portions 25L, 25R. Thus, the shaft portion 25L will be pressed against two sites which are the back portion 23LB of the first rim 23L and the front portion 24LF of the second rim 24L that are distant from each other in the direction of the central axis X2. Similarly, the shaft portion 25R will be pressed against two sites which are the back portion 23RB of the first rim 23R and the front portion 24RF of the second rim 24R that are distant from each other in the direction of the central axis X2. Therefore, there will be a frictional resistance when swinging the locking member 21. This frictional force allows the locking member 21 that has been raised to any position to be held in such state. Here, since the shaft portions 25L, 25R each abut against the inner wall of each of the corresponding shaft receiving holes 22L, 22R at the two sites that are distant from each other in the direction of the central axis X2, the locking member 21 can be stably swung without wobbling. Further, since the locking member 21 is configured by bending a metal wire material such as steel that has a circular cross-sectional shape, and the shaft receiving portions 20, 20 are made of a synthetic resin that is softer than the metal wire material, the back portions 23LB, 23RB of the first rims 23L, 23R of the shaft receiving holes 22L, 22R and the front portions 24LF, 24RF of the second rims 24L, 24R of the shaft receiving holes 22L, 22R will undergo deformation when pushed by the shaft portions 25L, 25R, thereby allowing the shaft receiving portions 20, 20 to abut against the shaft portions 25L, 25R via wide surfaces. Thus, the position of the locking member 21 can be reliably retained by the frictional force. Moreover, since the position retaining of the locking member 21 is realized only by the frictional force, regardless of the shape of the outer shell 2A of the portable freezer-refrigerator 1 as a device in which the plug lock mechanism 11 is to be installed, the position of the locking member 21 can be retained by a simple configuration of slanting the shaft receiving holes 22L, 22R.

Next, as shown in FIGS. 4 and 5, the plug 17 is to be plugged into the power receiving connector 16 of the power supply connection part 10 with the locking member 21 being held in such a state where the locking portion 27 has been raised. At that time, since the position of the locking member 21 is retained by the frictional force, there is no need for the user to hold the locking member 21 by his or her hand. Thus, the plug 17 can be easily plugged into the power receiving connector 16.

Further, as shown in FIGS. 6 and 7, the locking member 21 will be brought down by swinging the same. This allows the locking portion 27 to be positioned outside the locking surface 19 of the plug 17 that has been plugged. Under such condition, since the locking surface 19 of the plug 17 is abutted against the locking portion 27 of the locking member 21, the plug 17 can be prevented from being pulled out of the power receiving connector 16 even when the electric wire part 18 has been pulled as a result of, for example, having someone trip over it. Therefore, the plug 17 can be prevented from being inadvertently disconnected from the power receiving connector 16.

Here, if removing the plug 17 from the power receiving connector 16, the plug 17 may simply be pulled out of the power receiving connector 16 after lifting the locking member 21. Even at that time, since the locking member 21 is held in such a state where the locking portion 27 has been raised, there is no need for the user to hold the locking member 21 by his or her hand. Thus, the plug 17 can be easily removed from the power receiving connector 16.

As illustrated above, the plug lock mechanism 11 of the present invention includes the power receiving connector 16 as a female connector; the plug 17 that can be plugged into and pulled out of this power receiving connector 16; the pair of the shaft receiving portions 20, 20 that are provided across the power receiving connector 16; and the locking member 21 that is swingably and axially supported by the shaft receiving portions 20, 20. Further, it is configured in such a manner that this locking member 21 coaxially has the pair of the shaft portions 25L, 25R that are located at both ends thereof and correspond to the shaft receiving portions 20, 20; that the central axes X1L and X1R of the shaft receiving holes 22L, 22R of the shaft receiving portions 20, 20 are slanted with respect to the central axis X2 of the shaft portions 25L, 25R; and that the shaft portions 25L, 25R are to be pressed against the shaft receiving holes 22L, 22R. Thus, regardless of the shape of a device in which the plug lock mechanism 11 is to be installed, due to the simple structure described above, after plugging the plug 17 into the power receiving connector 16 while retaining the locking member 21 at any position via the friction caused by allowing the shaft portions 25L, 25R to be pressed against the shaft receiving holes 22L, 22R, the locking member 21 can then prevent the plug 17 from being pulled out.

Further, in the present invention, since the shaft portions 25L, 25R will each be pressed against each of the corresponding shaft receiving holes 22L, 22R at the two sites that are distant from each other in the direction of the central axis X2, the locking member 21 can be stably swung without wobbling.

Furthermore, in the present invention, since the locking member 21 is configured by bending a metal wire material such as steel, and the shaft receiving portions 20, 20 are made of a synthetic resin that is softer than the metal wire material, the shaft receiving holes 22L, 22R shall undergo deformation so as to be able to abut against the shaft portions 25L, 25R via wide surfaces, thereby allowing the locking member 21 to be reliably retained by friction.

Furthermore, in the present invention, the shaft receiving holes 22L, 22R are slanted in such a manner that the first rims 23L, 23R on the entrance sides of the shaft receiving holes 22L, 22R are more oriented toward the pull-out direction of the plug 17 than the second rims 24L, 24R on the back sides of the shaft receiving holes 22L, 22R, thereby allowing the locking member 21 to be easily attached to the shaft receiving portions 20, 20.

Figure 13:
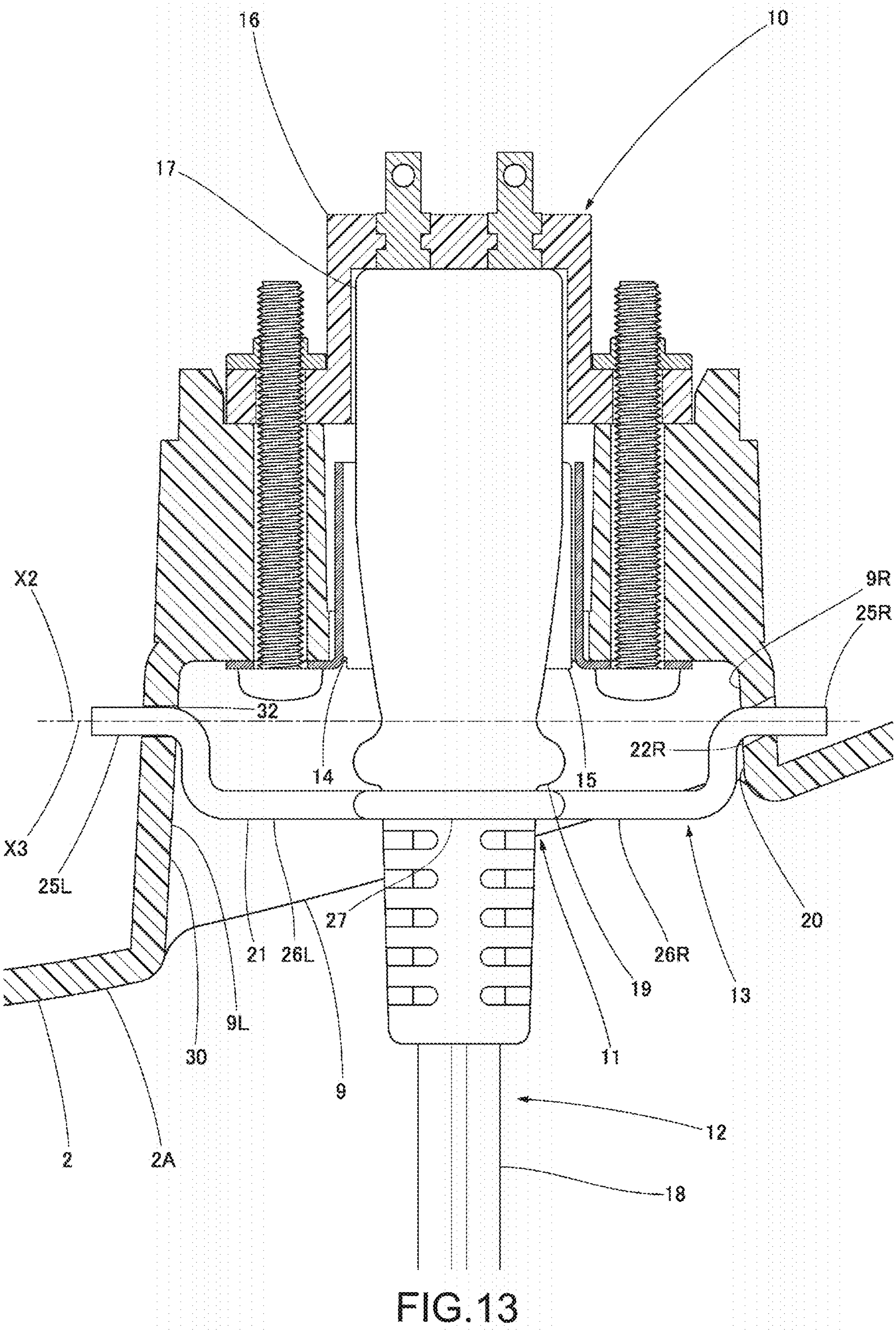
FIG. 13 is a horizontal cross-sectional view of a plug lock mechanism of another embodiment of the present invention.

Here, the present invention is not limited to the above embodiment, but may be variously modified within the scope of the gist of the present invention. For example, while the shaft receiving holes in the above embodiment are formed in a way such that they are slanted with respect to the horizontal direction, they may also be formed so that they are slanted with respect to the vertical direction. Further, while the shaft receiving holes in the above embodiment are through holes, they may also be bottomed holes. Furthermore, while the shaft receiving holes in the above embodiment are circular holes, they may also be holes having other shapes, such as polygonal holes and oval holes. Furthermore, while the plug is arranged on the power supplying side and the female connector is arranged on the power receiving side in the above embodiment, it may also be that the plug is arranged on the power receiving side and the female connector is arranged on the power supplying side. Furthermore, while both the central axes of the paired shaft receiving holes are slanted with respect to the central axis of the shaft portions in the above embodiment, there may also be employed a configuration where a central axis X3 of a shaft receiving hole 32 of one shaft receiving portion 30 is matched with the central axis X2 of the shaft portion 25L, and only the shaft receiving hole 22R of the other shaft receiving portion 20 is slanted, as shown in FIG. 13.

DESCRIPTION OF THE SYMBOLS

1 Portable freezer-refrigerator (device)
10 Power supply connection part
11 Plug lock mechanism
16 Power receiving connector (female connector)
17 Plug
20 Shaft receiving portion
21 Locking member
22L Left shaft receiving hole
22R Right shaft receiving hole
25L Shaft portion
25R Shaft portion
30 Shaft receiving portion
32 Shaft receiving hole
X1L Central axis of left shaft receiving hole 22L
X1R Central axis of right shaft receiving hole 22R
X2 Central axis of shaft portions 25L, 25R

What is claimed is:

1. A plug lock mechanism comprising:
a female connector;
a plug that can be plugged into and pulled out of the female connector;
a pair of shaft receiving portions that are provided across the female connector; and
a locking member that is swingably and axially supported by the shaft receiving portions, the locking member coaxially having a pair of shaft portions that are located at both ends thereof and correspond to the shaft receiving portions,
wherein central axes of shaft receiving holes of the shaft receiving portions are slanted with respect to a central axis of the shaft portions, and the shaft portions are to be pressed against inner walls of the shaft receiving holes.

2. The plug lock mechanism according to claim 1, wherein the shaft portions are to be respectively pressed against the inner walls of the shaft receiving holes at two or more sites that are distant from each other in the direction of the central axis of the shaft portions.

3. The plug lock mechanism according to claim 1, wherein the locking member is configured by bending a metal wire material, and the shaft receiving portions are made of a synthetic resin that is softer than the metal wire material.

4. The plug lock mechanism according to claim 1, wherein the shaft receiving holes are slanted in such a manner that entrance sides thereof are more oriented toward a pull-out direction of the plug than back sides thereof.

* * * * *